US009534570B2

(12) United States Patent
Desjardins

(10) Patent No.: US 9,534,570 B2
(45) Date of Patent: Jan. 3, 2017

(54) AIR CLEANER ASSEMBLY WITH INTEGRATED ACOUSTIC RESONATOR

(71) Applicant: MANN+HUMMEL GMBH, Ludwigsburg (DE)

(72) Inventor: Michael Desjardins, Willow Spring, NC (US)

(73) Assignee: MANN+HUMMEL GMBH, Ludwigsburg (DE)

( * ) Notice: Subject to any disclaimer, the term of this patent is extended or adjusted under 35 U.S.C. 154(b) by 84 days.

(21) Appl. No.: 14/511,336

(22) Filed: Oct. 10, 2014

(65) Prior Publication Data

US 2016/0102637 A1 Apr. 14, 2016

(51) Int. Cl.

| | |
|---|---|
| ***B01D 39/18*** | (2006.01) |
| ***B01D 45/08*** | (2006.01) |
| ***B01D 46/00*** | (2006.01) |
| ***B01D 46/52*** | (2006.01) |
| ***F02M 35/14*** | (2006.01) |
| ***F02M 35/02*** | (2006.01) |
| ***F02M 35/12*** | (2006.01) |

(52) U.S. Cl.

CPC ......... *F02M 35/0204* (2013.01); *F02M 35/02* (2013.01); *F02M 35/0201* (2013.01); *F02M 35/1255* (2013.01); *F02M 35/1266* (2013.01)

(58) Field of Classification Search

CPC ......... B01D 39/18; B01D 45/08; B01D 46/00; B01D 46/52; F01M 35/0203; F01M 35/14; F01M 35/1216; F01M 35/2266; F01M 35/1261; F01M 35/1277; Y10S 55/28

USPC .............. 55/417, 493, 462, 418, 385.3, 497, 510,55/DIG. 28; 123/198 E

See application file for complete search history.

(56) References Cited

U.S. PATENT DOCUMENTS

| | | | | |
|---|---|---|---|---|
| 5,865,863 A * | 2/1999 | DeSousa | F02M 35/0203 | 123/198 E |
| 8,562,726 B2 * | 10/2013 | Jun | F02M 35/02491 | 123/198 E |
| 8,864,866 B2 * | 10/2014 | Osendorf | B01D 46/0005 | 210/493.2 |
| 2006/0162303 A1 * | 7/2006 | Gunderson | B01D 46/0045 | 55/417 |
| 2010/0154736 A1 * | 6/2010 | Ohzono | F02M 35/024 | 123/198 E |
| 2012/0186207 A1 * | 7/2012 | Ushiyama | B01D 46/0005 | 55/493 |
| 2013/0291500 A1 * | 11/2013 | Rodabaugh | F02M 35/1216 | 55/462 |
| 2014/0260132 A1 * | 9/2014 | Maruyama | B01D 46/0041 | 55/418 |
| 2016/0059171 A1 * | 3/2016 | Lukasavitz | G01F 1/6842 | 96/422 |

* cited by examiner

*Primary Examiner* — Jacob T Minskey
*Assistant Examiner* — Minh-Chau Pham
(74) *Attorney, Agent, or Firm* — James Hasselbeck

(57) ABSTRACT

An air induction system for a vehicle having an engine includes a housing, a filter and an acoustic resonator. The housing includes a first housing member, a second housing member, and an air flow path passing through the housing. The filter is located within the housing and disposed in the air flow path for removing debris from intake air. The acoustic resonator is integrally formed with the first housing member and is operative to reduce noise generated by the engine.

12 Claims, 5 Drawing Sheets

AIR CLEANER ASSEMBLY WITH INTEGRATED ACOUSTIC RESONATOR

FIELD

The present teachings generally relate to air induction systems for vehicles. More particularly, the present teachings relate to an air cleaner assembly of an air induction system for a vehicle with an integrated acoustic resonator. Even more particularly, the present teachings relate to a cover of an air cleaner housing that integrally includes a resonator.

BACKGROUND

This section provides background information related to the present disclosure which is not necessarily prior art.

Air induction systems are used in automobiles, and other motor vehicles, to transport air from the environment to the engine for combustion. An air induction system conventionally includes a housing for accommodating a filter. The filter functions to remove dirt and other particulate matter that may be entrained in the intake air.

As air moves through the air induction system and into the engine, noise and vibration from the engine may be transmitted and amplified by the passages formed by the air induction system. In order to reduce the volume of these noises, it may be desirable to utilize an acoustic resonator that vibrates at a frequency equal and opposite to that produced by the engine, and thus produces sound waves that cancel the sound waves produced by the engine. The resonator is generally disposed on an upstream side of the filter housing.

While known resonators have generally proven to be acceptable for their intended purposes, a continued need in the relevant art remains.

SUMMARY

This section provides a general summary of the disclosure, and is not a comprehensive disclosure of its full scope or all of its features.

According to one particular aspect, the present disclosure provides an air induction system for a vehicle having an engine. The air induction system includes a housing, a filter and an acoustic resonator. The housing includes a first housing member, a second housing member, and an air flow path passing through the housing. The filter is located within the housing and disposed in the air flow path for removing debris from intake air. The acoustic resonator is integrally formed with the first housing member and is operative to reduce noise generated by the engine.

According to another particular aspect, the present disclosure provides an air induction system for a vehicle having an engine. The air induction system includes an air cleaner housing, a filter, and an acoustic resonator. The air cleaner housing includes a base member and a cover member. The cover member is removably secured to the base member. The filter is within a chamber of the housing and is disposed in an air flow path extending through the housing. The filter is operative to remove debris from intake air. The acoustic resonator is integrally formed with the housing and operative to reduce noise generated by the engine.

According to a further particular aspect, the present disclosure provides an air cleaner assembly. The air cleaner assembly includes a housing, a filter and an acoustic resonator. The housing includes a first housing member. The filter is disposed in the housing and is operative for filtering intake air passing through the housing. The acoustic resonator is integrally formed with the first housing member and is operative to attenuate sound passing along an airflow path through the air cleaner housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF VARIOUS ASPECTS

Figure 1:
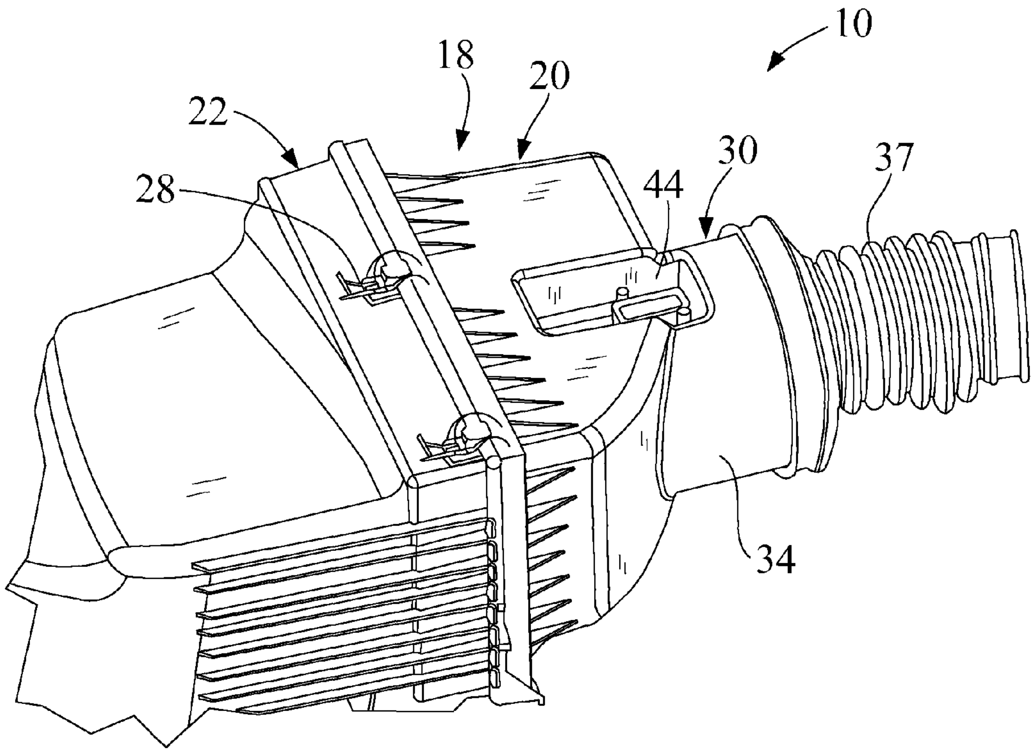
FIG. 1 is a perspective view of an air cleaner housing of an air induction system constructed in accordance with the present teachings to include a first housing member with an integrated acoustic resonator.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With general reference to FIGS. 1 through 5 of the drawings, an air cleaner assembly constructed in accordance with the present teachings is illustrated and identified at reference character 10. The air cleaner assembly 10 may be incorporated into an air induction system 12 (see FIG. 5) and may be used to transport a source of intake air 14 between the environment and an engine 16 (not shown) or other device utilizing a flow of air. The engine 16 may be a vehicle engine, for example. The air cleaner assembly 10 may also filter air passing along an air flow path AF. As will be described in more detail below, the air cleaner assembly 10 may also be used to affect the noise produced by the engine 16. By way of example only, the air cleaner assembly 10 may be used to produce sound waves that will cancel out or otherwise tune sound waves produced by the engine.

The air cleaner assembly 10 may generally include a housing 18 having a first housing member 20 and a second housing member 22. The first and second housing members 20 and 22 may be formed of plastic or other suitable material. In the embodiment illustrated, the first and second housing members 20 and 22 are injection molded. The first and second housing members 20 and 22 cooperate to define a housing chamber 24 in which a filter 26 is received. In the particular embodiment illustrated, the first housing member may be a cover member 20 and the second housing member may be a second cover member 22. The first cover member 20 may define a first chamber portion 24A of the chamber 24 and the second cover member 22 may define a second chamber portion 24B of the chamber 24. The filter 26 may be at least partially disposed in the second chamber portion 24B. The first cover member 20 may be removably secured to the second cover member 22 to facilitate removal and replacement of the filter 26. As shown in FIG. 1, the first cover member 20 may be secured to the second cover member 22 with one or more latches 28. An airtight seal may be defined between the first and second cover members 20 and 22 in a conventional manner. The filter 26 may be disposed within the first cover member 20 and may conventionally remove debris from the intake air 14 as the intake air 14 travels along the air flow path AF from the environment to the engine 16. In the embodiment illustrated, the filter 26 is a pleated filter housing a dirty side 26A and a clean side 26B. It will be understood, however, that various other types of filters may be alternatively incorporated within the scope of the present teachings.

The air cleaner assembly 10 further includes a resonator 30 for cancelling or otherwise reducing noise generated by the engine 16. The resonator 30 may be integrally formed with one of the first and second cover members 20 and 22. In the embodiment illustrated, the resonator 30 is integrally formed with the first cover member 20. In one particular application, the first cover member 20 is injection molded to monolithically include the resonator 30.

As illustrated, the resonator 30 may be formed to include an inner wall 32 and an outer wall 34. The inner and outer walls 30 and 32 may be connected by an end wall 36. A duct 37 may be conventionally secured to a free end of the outer wall 34. An end wall 39 of the first cover member 20 may generally extend in a radial direction from the outer wall 34 of the resonator 30 in such a manner that a first portion 30A of the resonator 30 extends into the first chamber portion 24A and a second portion 30B of the resonator 30 extends from the remainder of the first cover member 20 and outside of the first chamber portion 24A.

Figure 2:
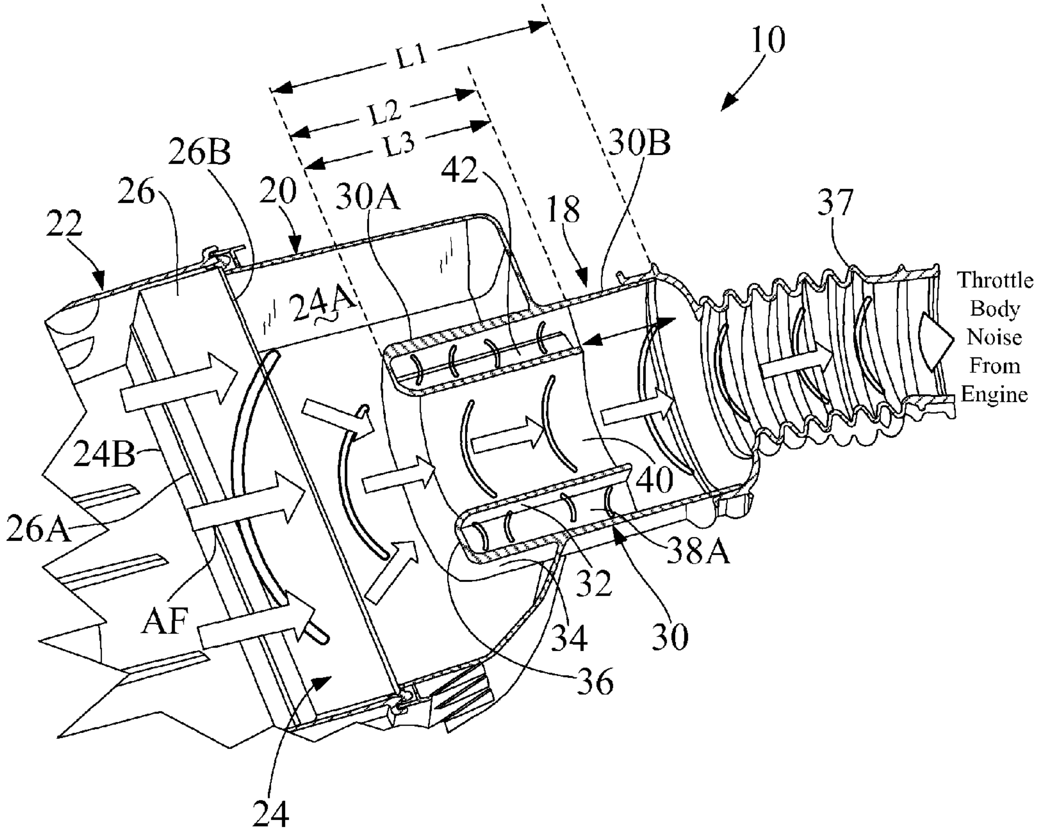
FIG. 2 is a cross-sectional view of a portion of the air cleaner housing of the present teachings.
Figure 3:
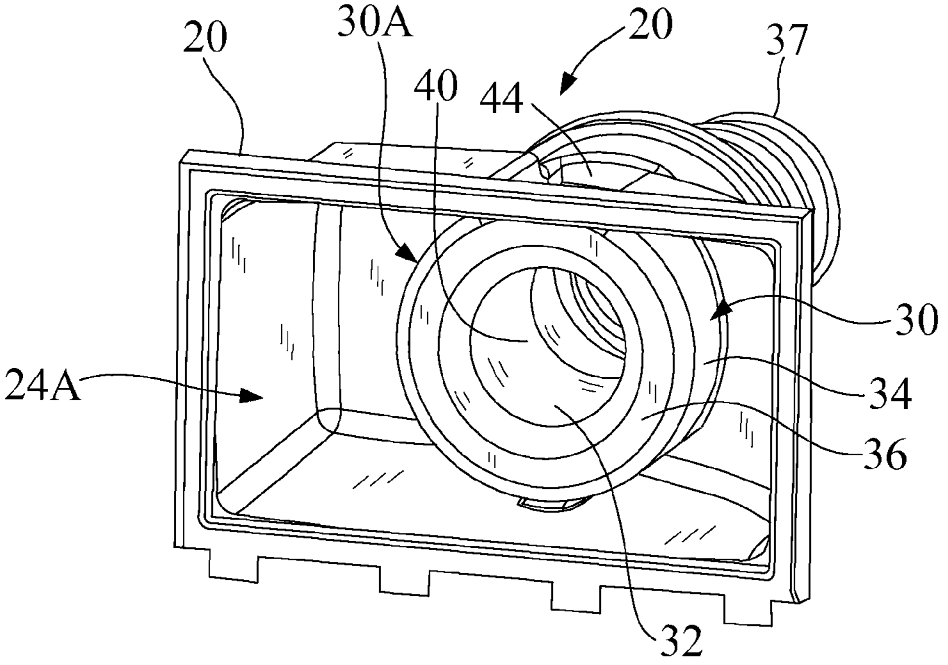
FIG. 3 is a front perspective view of the first housing member cover of the air cleaner housing of FIG. 1.
Figure 4:
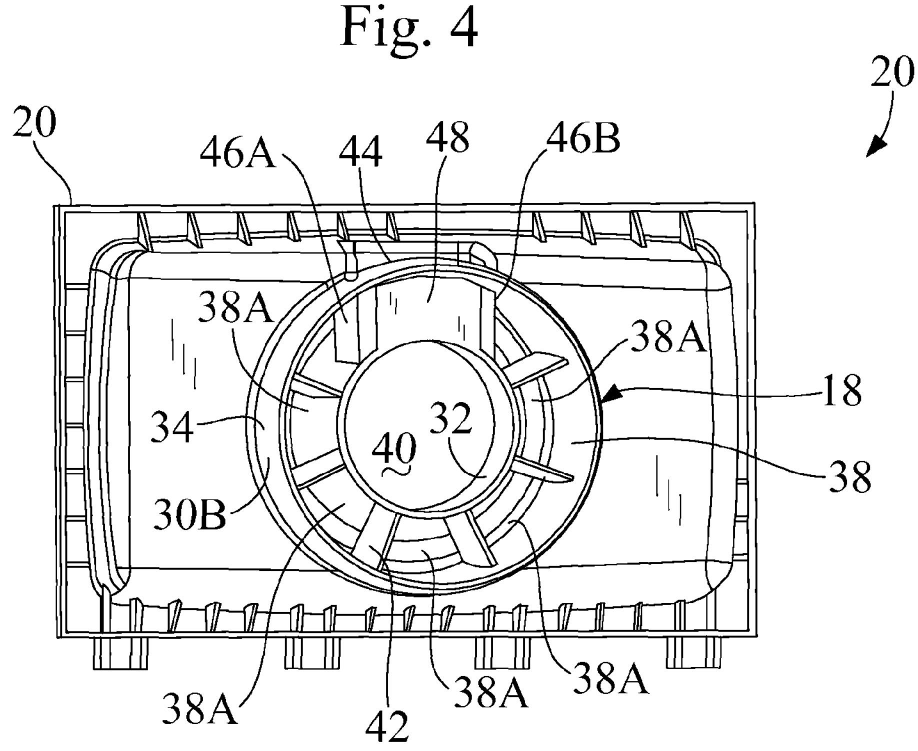
FIG. 4 is a rear view of the first housing member of FIG. 3.
Figure 5:
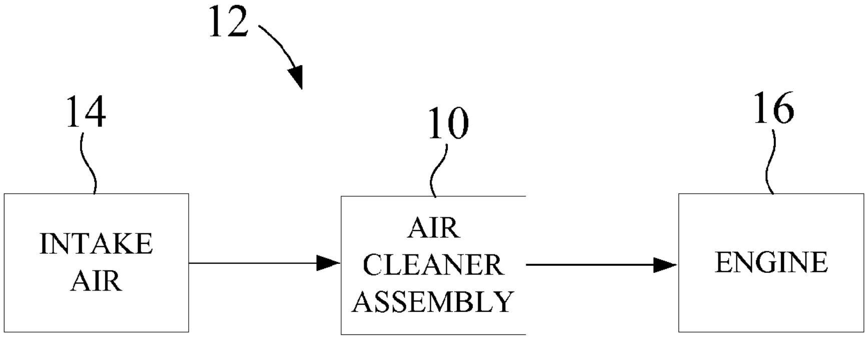
FIG. 5 is a simplified view of an air induction system incorporating the air cleaner housing of the present teachings and shown operatively associated with a vehicle engine.

The inner wall 32 and the outer wall 34 may be generally cylindrical in shape and concentrically adjoined by the end wall 36. Accordingly, the end wall 36 may be annular. It will be appreciated, however, that the inner wall 32 and the outer wall 34 may have alternative geometries within the scope of the present teachings. The outer wall 34 may extend a distance L1 in an axial direction from the end wall 36 and may define an inner diameter D1. The inner wall 32 may extend a distance L2 in the axial direction from the end wall 36 and may define an inner diameter D2. The ratio of L1 to L2 may be between approximately 4:1 and 1:1. The ratio of D1 to D2 may be between approximately 4:1 and 3:21. With particular reference to FIG. 2, in one configuration, the ratio of L1 to L2 may be 3:2 and the ratio of D1 to D2 may be 2:1. In one particular application, the inner diameter D1 of the outer wall 34 is 135 mm, the inner diameter D2 of the inner wall 32 is 75 mm, the length L1 of the outer wall 34 is 158 mm, and the length L2 of the inner wall 32 is 145 mm.

Figure 6:
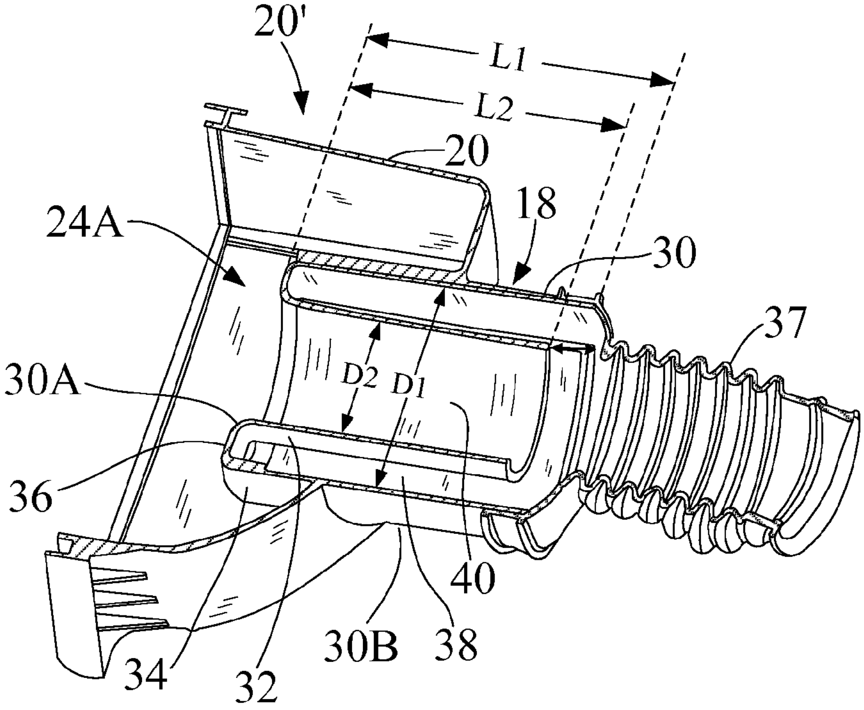
FIG. 6 is a cross-sectional view similar to FIG. 2 of another housing element for an air cleaner housing including an integrated resonator in accordance with the present teachings.
Figure 7:
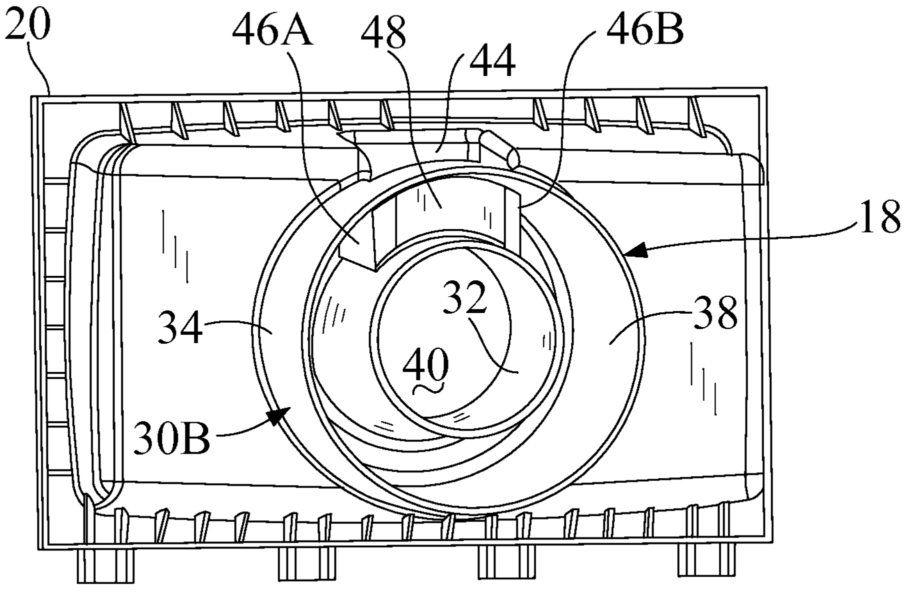
FIG. 7 is a rear view similar to FIG. 4, further illustrating the first housing member of FIG. 5.

With reference to FIGS. 6 and 7, another first housing member in accordance with the present teachings is illustrated and identified at reference character 20'. Given the similarities between the first housing members 20 and 20', like reference characters have been used to identify similar elements throughout the views. In this particular embodiment, the ratio of L1 to L2 may be approximately 5:4. Reducing the ratio of L1 to L2 may allow noise to enter the resonator 30 while minimizing the amount by which the flow of air through the air induction system 12 is restricted. The inner wall 32 may be substantially parallel to the outer wall 34. The end wall 36 may be substantially perpendicular to the inner wall 32 and the outer wall 34. Accordingly, the inner and outer walls 32 and 34 may define a chamber 38 therebetween, while the inner wall 32 may define a passage 40 therethrough.

The resonator 30 may be formed to further include a series of radially extending fins or ribs 42 and a mount portion 44. The ribs 42 may extend between and connect the inner wall 32, the outer wall 34, and the end wall 36. In this manner, the chamber 38 may divide into a series of small sub-chambers 38A. While the ribs 42 are shown as being generally equally and symmetrically spaced about the resonator 30, it is also understood that the ribs 42 may be asymmetrically spaced within the scope of the present teachings to create variously-sized chambers 38A. In one configuration, the resonator 30 may include six ribs 42 extending a distance L3 in the axial direction from the end wall 36. While the distance L3 is illustrated as being equal to the distance L2, it is also understood that the ribs 42 may extend a distance less than L2 within the scope of the present teachings. By varying the distances L1, L2, and L3 and the spacing between the ribs 42, the volume of the chamber 38 and the sub-chambers 38A may vary within the scope of the present teachings, depending upon particular sound attenuation requirements.

The mount portion 44 may be formed as a recessed or cut-away portion of the outer wall 34 and the remainder of the first cover member 20. The mount portion 44 may be defined by parallel sidewalls 46A, 46B, and an end wall 48 extending between and connecting the inner wall 32, the outer wall 34, and the remainder of the first cover member 20.

Operation of the air induction system 12 will now be further described. With particular reference to FIG. 2, as the source of intake air 14 travels generally in a first direction through the filter 26, clean air travels through the passage 40 and the duct 37 into the engine 16. Sound waves and vibrations produced by the engine 16 may travel generally in a second direction (opposite the first direction) through the duct 37 and into the resonator 30. As sound waves travel through the resonator 30, they may reverberate and vibrate within the chamber 38 and/or the sub-chambers 38A to create acoustic pressure at the end of the resonator 30 proximate the end wall 36 and effectively reduce, cancel, or otherwise change the volume of sound waves produced by the engine 16. The volume of the chamber 38 can be adjusted by varying the dimensions of the resonator 30, as described herein, in response to the air flow requirements of the engine 16.

It will now be understood that the present teachings provide a resonator that may be integrated into a clean side cover of an air induction system. The resonator utilizes internal volume of an air box that would otherwise just be included in the natural volume of the air box and not a tunable device. By utilizing this volume in an acoustic device, the resonator may be modified to hit desired frequencies, as desired. The present teachings may be incorporated into existing components simply through the addition of material. In this manner, the number of components may remain low, which in turn will keep associated costs low. The resonator volume can be manipulated various ways, as discussed above. The present teachings provide an ability to satisfy strict acoustic targets within limited packaging space.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An air induction system for a vehicle having an engine, the air induction system comprising:

a housing having an air flow path passing therethrough, the housing including a first housing member and a second housing member;

a filter located within the housing and disposed in the air flow path for removing debris from intake air; and an acoustic resonator integral with the first housing member, the resonator operative to reduce noise generated by the engine, the acoustic resonator including:

a tubular outer wall having an axial elongation length L1 from a first axial end arranged nearest to the filter, to an opposing second axial end of the tubular outer wall;

a circumferentially closed tubular inner wall arranged in a radial interior of and spaced radially away from tubular outer wall, the circumferentially closed tubular inner wall having an axial elongation length L2 from a first axial end to an opposing second axial end of the circumferentially closed tubular inner wall;

wherein the circumferentially closed tubular inner wall at its radial interior forms an airflow passage conducting air flow entering or leaving the housing on the air flow path;

an annular resonator chamber arranged between and defined by radial spacing separating the tubular outer wall and the circumferentially closed tubular inner wall;

an annular end wall radially closing a first axial end of the annular resonator chamber from tubular outer wall to circumferentially closed tubular inner wall, the annular end wall arranged proximate to the first axial end of the tubular outer wall or the first axial end of the circumferentially closed tubular inner wall;

wherein the annular resonator chamber is closed radially, and has an annular opening at a second axial end of the chamber, the annular opening arranged radially between the tubular outer wall and the circumferentially closed tubular inner wall and in communication with the airflow path;

wherein the acoustic resonator is arranged at least partially in an interior of the housing.

2. The air induction system of claim 1, wherein the circumferentially closed tubular inner wall is a cylinder and the tubular outer wall is a cylinder concentrically disposed about the circumferentially closed tubular inner wall forming the annular resonator chamber therebetween.

3. The air induction system of claim 2, wherein the resonator chamber is operative to alter sound waves produced by the engine.

4. The air induction system of claim 1, wherein the resonator further includes a plurality of ribs extending between and connecting the circumferentially closed tubular inner wall and the tubular outer wall and dividing the resonator chamber into a plurality of axially extending radially closed sub-chambers which open at the annular opening of the resonator chamber.

5. The air induction system of claim 1, wherein

L1 is greater than L2 forming an expansion chamber at the second axial end of the circumferentially closed tubular inner wall, the expansion chamber coupling the resonator chamber to the air passage.

6. The air induction system of claim 1, wherein the circumferentially closed tubular inner wall and the tubular outer wall of the resonator axially extend into a chamber defined by the housing and a flow face of the filter.

7. The air induction system of claim 1, wherein:

the housing includes a first housing member; and a second housing member, the first housing member removably secured onto the second housing member, the first and second housing members defining and closing a chamber in which the filter is installed in the housing;

wherein the acoustic resonator is integrally formed together with the first housing member as a one-piece unitary molded component.

8. The air cleaner assembly of claim 7, wherein the first housing member defines a cover of the housing.

9. The air induction system of claim 1 wherein the tubular outer wall is circumferentially closed.

10. The air induction system of claim 1 wherein the annular opening to the annular chamber is formed by radial spacing between the tubular outer wall and the circumferentially closed tubular inner wall;

wherein the annular opening is arranged at the opposing second axial end of the circumferentially closed tubular inner wall.

11. The air induction system of claim 1 wherein the tubular outer wall, circumferentially closed tubular inner wall and the an annular end wall are formed together as a unitary one-piece component.

12. The air induction system of claim 1 wherein the annular end wall closing the first axial end of the annular resonator chamber is arranged at and connects the first axial end of the tubular outer wall to the first axial end of the circumferentially closed tubular inner wall.

* * * * *